G. F. ROYER.
FLEXIBLE PIPE.
APPLICATION FILED SEPT. 27, 1907.
899,623.
Patented Sept. 29, 1908.
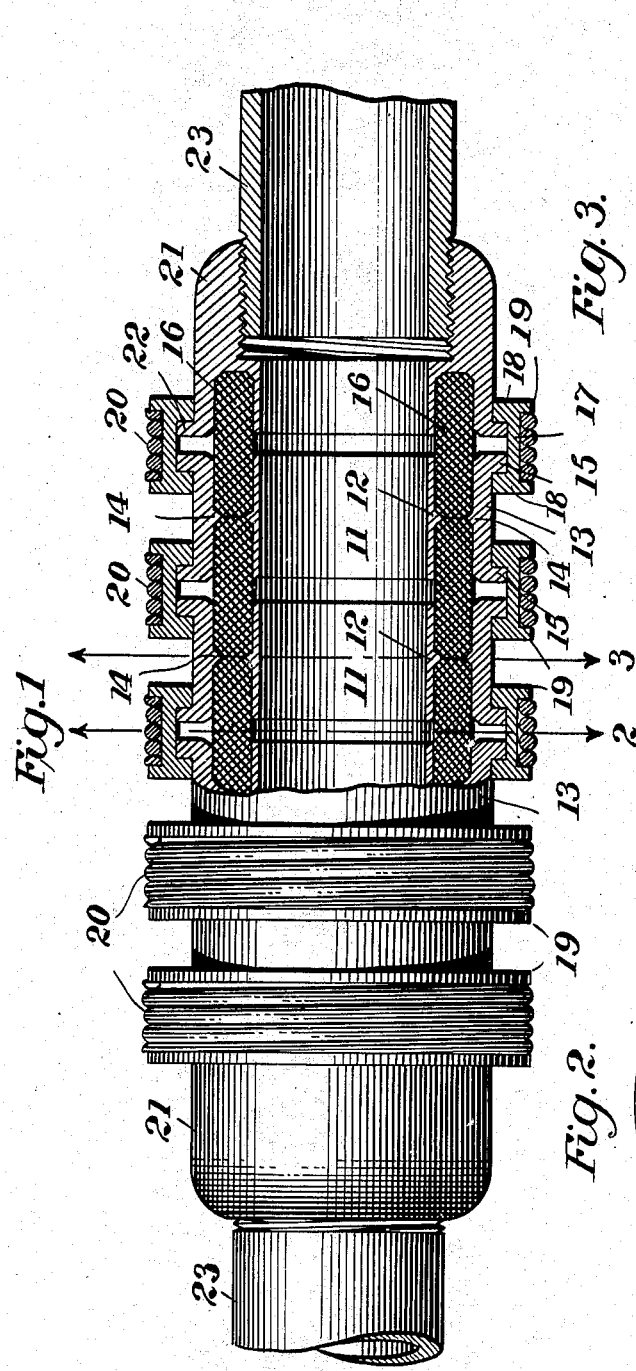
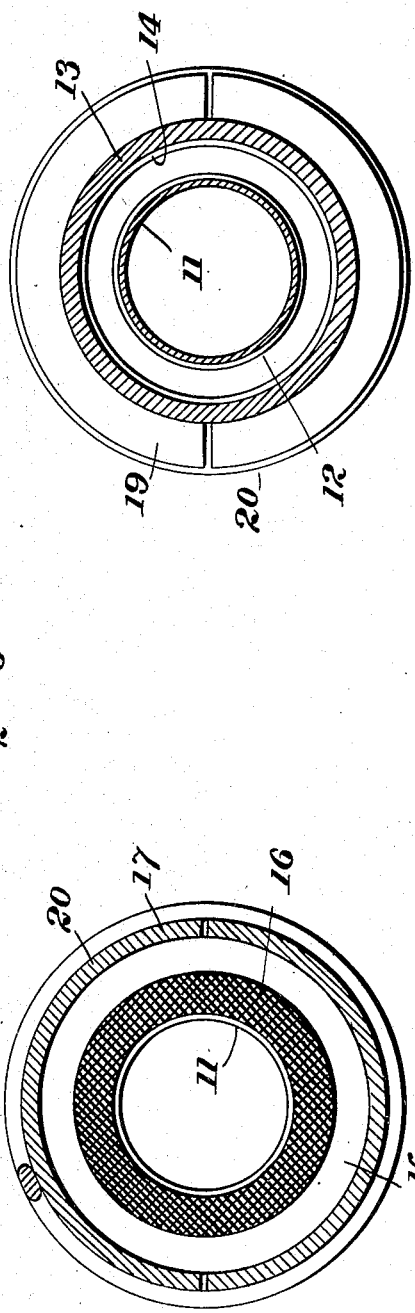
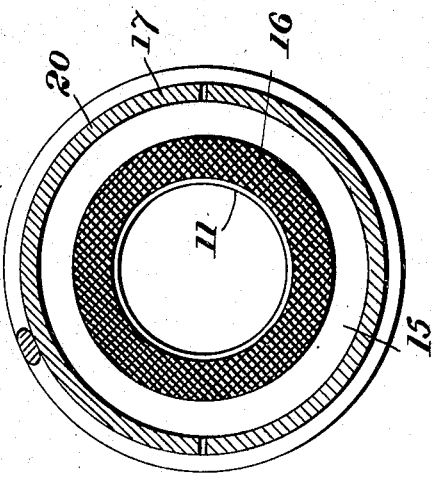
Witnesses
J. G. Stinkel
J. J. McCarthy
Inventor
George F. Royer
by
Foster Freeman Watson & Coit
Attorneys

UNITED STATES PATENT OFFICE.

GEORGE F. ROYER, OF WILKES-BARRE, PENNSYLVANIA.

FLEXIBLE PIPE.

No. 899,623.      Specification of Letters Patent.      Patented Sept. 29, 1908.

Application filed September 27, 1907. Serial No. 394,884.

*To all whom it may concern:*

Be it known that I, GEORGE F. ROYER, a citizen of the United States, and resident of Wilkes-Barre, Luzerne county, State of Pennsylvania, have invented certain new and useful Improvements in Flexible Pipes, of which the following is a specification.

The object of the present invention is to produce a flexible tube or pipe adapted to convey steam, air or other fluid under pressure.

The invention is applicable to pipes for connecting the steam and air systems of railway cars and also applicable to any other situation in which flexible pipes or hose may be used.

Another object of the invention is to produce a built-up flexible pipe which is made of any number of series of duplicate parts and which may therefore be constructed of any desired length.

The invention will be described in connection with the accompanying drawing, in which, Figure 1 is a side view, partly in section, of a flexible pipe embodying the present invention; Figs. 2 and 3 are sections on the lines 2 and 3 of Fig. 1 respectively.

Referring to the drawing it will be seen that the invention comprises a series of inner rings or tube-sections 11, each having an annular rib 12 on its outer surface; a series of outer rings 13; each having an annular rib 14 on its inner surface and outwardly projecting annular flanges 15 at its ends; a series of rings or tubular sections 16 of rubber or other elastic material arranged alternately with the rings 11 and interposed between the rings 11 and 13; a series of sectional outer rings 17 having inwardly extending annular flanges 18 which engage the flanges 15 and the rings 13, and outwardly extending flanges or projections 19 for confining the wire coils 20 or other means for uniting the sections of each ring.

The ribs 12 and 14 are preferably arranged centrally of the rings 11 and 13 and the rings 11 and 13 are preferably about the same length and are separated when assembled sufficiently to permit the pipe to bend to the desired extent. The flexible pipe or coupling may be made of any desired length by building it up of the requisite number of the several kinds of sections above described in a manner to be presently explained. At each end of the flexible pipe I provide a coupling section 21, the inner end of which is recessed to receive one end of the adjacent flexible ring 16 and provided with an exterior flange 22 to be engaged by the adjacent sectional ring 17. The coupling section is suitably threaded to receive a pipe 23 which is preferably of the same internal diameter as the interior of the coupling 21 and the rings 11.

In assembling the various parts to form a flexible pipe or coupling, one of the flexible sections 16 is first placed in the annular recess in the coupling section 21, in which it fits closely. An inner ring 11 is then fitted into the outer end of the flexible ring until the shoulder or rib 12 abuts against said flexible ring. An outer ring 13 is then fitted upon the outer side of the flexible ring until its shoulder 14 abuts against the flexible ring. The ribs 12 and 14 are preferably triangular and the corners of the flexible rings are preferably beveled to fit against said ribs, as shown in the drawing. A second flexible ring is then inserted in the recess between the inner and outer rings until it abuts against the ribs 12 and 14 and also against the previously assembled flexible section. In the same manner additional rings 12, 14 and 16 are assembled until the desired length of the flexible pipe is attained. To hold the parts in position the sectional rings 17 are applied, as shown in the drawing, and the sections of each ring are secured together and in place by wire or other suitable fastening 20. When wire is used it can be tied temporarily or it may be soldered or sweated permanently in place. The groove of rectangular section between the ribs 19 may be substituted by a groove of other form, such as a simple circular groove adapted to hold two or three strands of wire or a band.

The flexible pipe or coupling is normally straight, as shown in Fig. 1, and the flexible rings 16 abut against each other forming a continuous wall which prevents leakage. When the pipe is bent the portions of the flexible rings on the inner side of the bend are compressed while the portions on the outer side of the bend retain their normal condition of contact with each other. The rigid sections 11 and 13 are separated sufficiently to allow considerable flexure of the pipe, the amount of spacing depending upon the diameter of the pipe and the purpose to which it is to be applied.

It will be understood that the sectional rings 17 do not grip the rings 14 with sufficient force to prevent them from moving relatively. It will also be understood that the rings 17 simply act to prevent separation of the rings 13 and do not sustain any strain due to the internal pressure in the pipe.

Having described my invention what I claim and desire to secure by Letters-Patent is, 1. A flexible tube comprising a plurality of flexible rings abutting end to end, a plurality of separated rings within the flexible rings and arranged alternately therewith, and a plurality of separated rings surrounding the flexible rings and arranged alternately therewith.

2. A flexible tube comprising a plurality of inner rings, a plurality of flexible rings abutting end to end and surrounding said inner rings, a plurality of outer rings surrounding the flexible rings, and means for preventing the outer rings from moving apart axially.

3. A flexible tube comprising a plurality of inner rings each having an annular rib on its outer surface, a plurality of outer rings each having an annular rib on its inner surface, a plurality of intermediate flexible rings arranged alternately with the inner and outer rings and having their ends abutting against said ribs and against each other, and means limiting the separation of the outer rings, the adjacent inner and outer rings being normally separated to permit of flexure of the tube.

4. A flexible tube comprising a series of inner rings, a series of surrounding flexible rings arranged alternately with the inner rings, a series of outer rings surrounding the flexible rings and arranged alternately therewith, the said outer rings having outwardly extending flanges at their ends, and means for engaging the said flange to prevent abnormal separation of the outer rings.

5. A flexible tube comprising a series of inner rings, a series of surrounding flexible rings arranged alternately with the inner rings, a series of outer rings surrounding the flexible rings and arranged alternately therewith, the said outer rings having outwardly extending flanges at their ends, and rings having inwardly extending flanges for engaging the flanges of said outer rings.

6. A flexible tube comprising a series of inner rings, a series of surrounding flexible rings arranged alternately with the inner rings, a series of outer rings surrounding the flexible rings and arranged alternately therewith, the said outer rings having outwardly extending flanges at their ends, and sectional rings having inwardly extending flanges to engage the flanges of the outer rings and having a surrounding band to hold the sections in place.

7. In a flexible tube, the combination with a series of separated inner rings, a series of separated outer rings, a series of abutting intermediate elastic rings, and means for preventing abnormal separation of the outer rings, of a coupling section having an annular recess to receive the end of one of said elastic rings, and means for preventing abnormal separation of said coupling and the adjacent outer ring.

In testimony whereof I affix my signature in presence of two witnesses.

GEORGE F. ROYER.

Witnesses:
EDWARD N. NOLL,
JOHN J. O'DONNELL.